Dec. 17, 1968 M. D. PETROFF ET AL 3,416,219

METHOD FOR MOUNTING VERY FINE WIRES

Filed June 13, 1966

INVENTORS
MICHAEL D. PETROFF
STANLEY F. SWIADEK
BY Allen E. Botney
ATTORNEY 3,416,219

METHOD FOR MOUNTING VERY FINE WIRES

Michael D. Petroff, Los Angeles, and Stanley F. Swiadek, Pasadena, Calif., assignors to National Engineering Science Company, Pasadena, Calif., a corporation of California Filed June 13, 1966, Ser. No. 557,261
5 Claims. (Cl. 29—471.1)

The present invention relates in general to the use of very fine wires and more particularly relates to a method of mounting such wires on a frame of some kind.

Extremely fine wires are oftentimes required for various kinds of utilitarian applications. For example, an extremely fine platinum wire, commonly referred to as a Wollaston wire, is used in an instrument known as a bolometer to measure radiated power in waveguides and otherwise. However, wires that are so fine that they can barely be seen, if at all, present numerous problems in connection with their handling and use. Thus, these wires are so thin that they curl up or tend to do so, with the result that they can be handled only with difficulty. Furthermore, it will be recognized that anything so thin must be handled with great care or else it will break and, in fact, this is one of the more serious problems encountered in the prior art. Still another problem of serious proportions is that of making electrical connections to these threads of wire. It will be recognized that because of these and other problems, the cost of the apparatus that includes such elements is materially increased. A further and more significant disadvantage lies in the fact that the length of these wires must be undesirably reduced so as to make them more manageable, with the result that the sensitivity of the instruments in which they are mounted are thereby correspondingly reduced.

It is, therefore, an object of the present invention to provide a method for expediting and facilitating the mounting of extremely fine lengths of wire.

It is another object of the present invention to provide a method that will permit considerably longer lengths of very fine wire to be handled and utilized.

It is a further object of the present invention to provide a method that facilitates and expedites making electrical connections to very fine wires.

It is an additional object of the present invention to provide a method for reducing breakage in the handling and mounting of very fine wires.

It is still another object of the present invention to provide a method for mounting very fine wires by means of which the cost of handling and using them is significantly reduced.

The present invention overcomes the problems and disadvantages previously mentioned, and it does so, first, by providing a technique for holding or maintaining a very fine wire in a fully extended position while it is being handled; second, by providing the further technique of facilitating the mounting of such a wire onto a frame; and, third, by providing new and novel steps by means of which electrical connections can be made to such wires. More particularly, the present invention basically involves the method of connecting or otherwise coupling the ends of a wire to elements that help to keep the wire taut, of applying a material to the sides of the frame onto which the wire is to be mounted that not only bonds the wire to the frame but also provides an electrical conduit or path to the wire, and of mounting the wire across the frame, the step of mounting the wire comprising the substeps of rotatably positioning the frame at an angle, bringing one end of the wire into contact with one side of the frame, and swinging the frame around until the opposite side of the frame contacts the opposite end of the wire, the wire thereby being physically bonded to the sides of the frame. The method is easily utilized, and with it the difficulties encountered in the prior art are avoided.

The novel features which are believed to be characteristic of the invention, together with further objects and advantages thereof, will be better understood from the following description considered in connection with the accompanying drawing in which the basic steps of the method of the present invention are illustrated by way of example. It is to be expressly understood, however, that the drawing is for the purpose of illustration and description only and is not intended as a definition of the limits of the invention.

Figure 1:
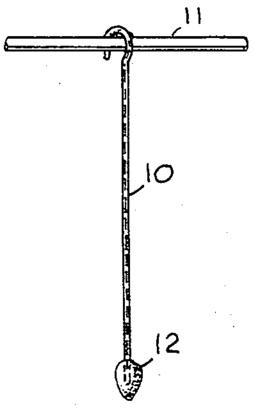
FIGURE 1 illustrates the step by means of which a strand of very fine wire is held taut in preparation for an acid bath.

For a more detailed description of the invention, reference is now made to the drawing wherein like elements are similarly designated throughout the several figures. In FIG. 1, there is shown a very fine wire 10 that is cemented or bonded at one end to a rod 11, and which has a suitable weight 12 affixed or added onto its other end. As previously stated, wire 10 is a very fine wire, by which is meant that its diameter may be in the range of from 10 to 50 micro-inches, or thereabouts. The previously mentioned Wollaston wire is a good example of a wire whose diameter falls into this range and, therefore, throughout the description that follows it shall be understood that it is the Wollaston wire that is being discussed and considered. However, before proceeding, it should be mentioned that Wollaston wire is made up of two metals, namely a platinum core surrounded by a jacket of silver. As is well known by those who are familiar with Wollaston wire and its uses, it is only the platinum core that is generally utilized and, therefore, it is customary to remove the outer shell of silver beforehand, usually by immersing the wire in an acid bath.

Figure 2:
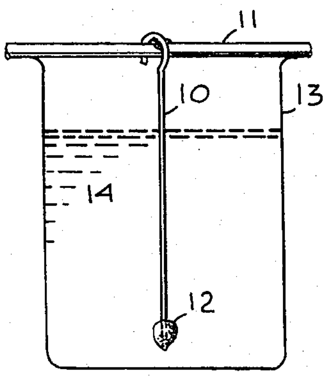
FIGURE 2 illustrates the wire in the FIG. 1 arrangement immersed in the acid bath.

To prepare wire 10 for such an acid bath and the handling to which it will subsequently be subjected, the wire is kept in a taut or extended condition, and it is for this reason that the wire is attached to rod 11 at one end and has a weight 12 affixed to the other end. Rod 11 may be made of any material, but is preferably made of glass, and should be long enough to span the diameter of the vessel containing the acid. In addition, it is preferred that one end of the rod be bent at a right angle to the rod, as is shown in the figure, so that the handling of the rod can be facilitated. The bent end also acts as a weight, and thereby insures the user that the same side of the rod will always face the vessel or beaker in which the acid is contained, as may be seen from FIG. 2. In this way, the rod will not roll, and the length of wire immersed in the acid will thereby remain substantially constant.

The material for weight 12 should be one that is not affected by the acid to be used, such as nitric acid, since this acid is most frequently used. One such material is butyl acetate and can be obtained in convenient form under the trade name "Duco Cement" by DuPont. Equal volumetric parts of "Duco Cement" and acetone will make a very satisfactory coating mixture that is easy and simple to apply. If the end of a piece of wire is dipped into the mixture of "Duco Cement" and acetone and quickly withdrawn, a very thin film of butyl acetate will be left behind on the wire. Under the protection of this film, nitric acid will not etch the silver jacket on the wire and, therefore, it will provide a weight after the other portion of wire has had the silver jacket removed. The length of wire that should be coated with butyl acetate is a function of the diameter of the core of the wire and the length of platinum core that will be exposed by the acid edge, as well as the method by which the platinum core is handled for mounting purposes. It is up to the user to determine the best length for his own particular purpose. One note of caution should, however, be mentioned. More specifically, if the butyl acetate coat forms a globular mass at the end of the wire, or a long filament is found attached to the end of the wire, then the butyl acetate should be removed and the wire recoated. The end of the wire must be free of large surfaces or irregularities that can be acted upon by the surface tension of liquids, and the reason for this will be explained later.

In preparing wire 10 for an acid bath, the wire is first cut to the desired length and then cleaned, the final length of wire required for mounting being taken into account beforehand. For example, approximately ¼ inch of wire length will not be etched because of material 12 and, additionally, some length of wire is needed for handling purposes, and both should be taken into consideration. In pre-cleaning the wire, oils and dirt are preferably removed by using acetone or some similar type of degreasing agent. However, the method of cleaning is optional, and satisfactory results can be obtained with ultrasonic cleaning; degreasing; flushing with acetone or its equivalent; or even by wiping with a soft, absorbent paper or cloth that has been soaked with acetone or its equivalent. Caution should be exercised after the wire has been cleaned by not touching or handling it with bare hands, since any trace of hand oil will affect the acid-etching operation and result in an incomplete etch. Accordingly, some sort of instrument preferably should be used in handling the wire after it is cleaned, for example, a tweezer having a very fine tip.

Assuming that wire 10 has already been cut to the proper length and suitably cleaned, for the reasons and in the manner previously mentioned, one end of the wire is then attached to rod 11 and a drop of material 12 is added to the other end of the wire. The result is that shown in FIG. 1.

Figure 3:
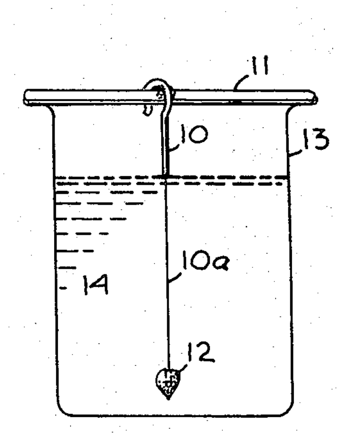
FIGURE 3 illustrates the wire after an outer metal layer has been etched away, thereby leaving the inner metal core.

At this point wire 10 is put into a beaker 13 containing an acid solution 14, only one wire per beaker to prevent tangling. Remembering that the wire is extremely fine, an effective technique for getting the wire into the acid is to imagine the wire to be a needle and the surface of the acid solution a balloon or bubble, and then jab the wire into the acid as if puncturing the baloon or bubble. Once this is accomplished, the wire is slowly lowered until rod 11 straddles the top of the beaker in the manner shown in FIG. 2. As was previously mentioned, the right angle section of the rod prevents any rolling or movement during the etching process. The wire should be allowed to stay in the acid solution for a minimum of eight hours if the silver jacket is to be entirely removed. In this regard, it should be noted that in approximately 30 minutes it will seem as if the silver jacket of the Wollaston wire has been removed, but experience has shown that minute traces of silver will be present for at least four hours. However, if absolute cleanliness and freedom from silver is not required, the time of acid etching may be reduced at the user's option. It should also be noted that small bubbles will occasionally be seen clinging to the wire after approximately 30 minutes of etching. In this case, a slight tap on the side of the beaker will dislodge the bubbles. The platinum core 10*a* of the Wollaston wire is shown in FIG. 3 and, as illustrated therein, those portions of wire 10 that are above the surface of the acid and beneath material 12 remain unetched. It will also be apparent from FIG. 3 that platinum wire 10*a* is so thin that the coating of material 12 can, in fact, act as a weight to prevent the curling and tangling of the platinum wire thereabove.

Figure 4:
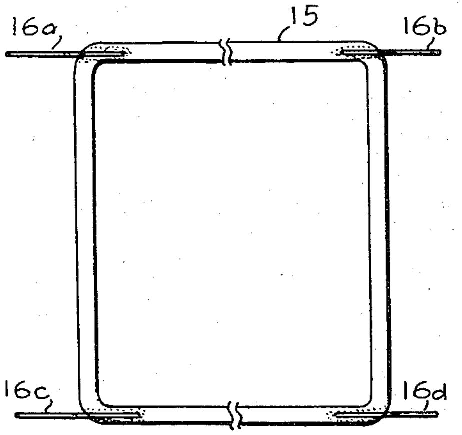
FIGURE 4 illustrates one kind of frame across which the FIG. 3 wire may be mounted.

After sufficient time has elapsed to remove the silver jacket, the wire is removed from the acid solution by simply grasping the glass rod and pulling up at a steady rate. If the butyl acetate coat on the end of the wire is properly formed, the end of the wire will pop through the surface tension of the acid with no trouble. However, if there is a large mass or some irregularity that would increase the effects of surface tension, wire 10*a* will break regardless of the method by which the wire is removed. It is for this reason that the user was heretofore cautioned concerning the formation of material 12. After the wire is removed from the acid solution, it can, if it is so desired, be safely stored in a suitable container by allowing it to hang from the glass rod, or else it can be mounted on a frame, such as glass frame 15 in FIG. 4 which has metal rods or wires 16*a*–16*b* embedded in the glass at the corners of the frame for electrical connection purposes. The metal rods are cemented in position and are, therefore, firmly rooted in the glass. Although not a significant point, it will nevertheless be mentioned that two, rather than four, of the rods, for example, rods 16*a* and 16*b*, could be used instead for this purpose.

Proceeding now to the actual mounting of platinum wire 10*a* onto frame 15, a thin film of liquid Bright Gold N.W. material, or its equivalent, designated 17 in FIGS. 5–8, is first applied to two opposing sides of frame 15, material 17 being applied in a continuous path up to and onto each of embedded connecting rods 16. In some instances, it may even be desirable to grind away a small section of glass in the vicinity of the embedded connecting rod in order to assure a smooth, continuous transition from glass to metal. In this case, the Bright Gold N.W. compound is applied to this region and continued along one side of the frame. Bright Gold N.W. is an organic solution of gold which dries to produce a metallic film on almost any kind of material, such as glass, ceramic, plastic laminate, and many metals. In the present invention, it is used not only to bond wire 10*a* to frame 15, but also to provide continuous electrical paths from the wire to the metal rods. Considerable information concerning material 17 may be obtained from the Ralph T. Hopper article entitled "How To Apply Noble Metals to Ceramics," published in the June 1963 issue of Ceramic Industry.

Figures 5, 6, 7:
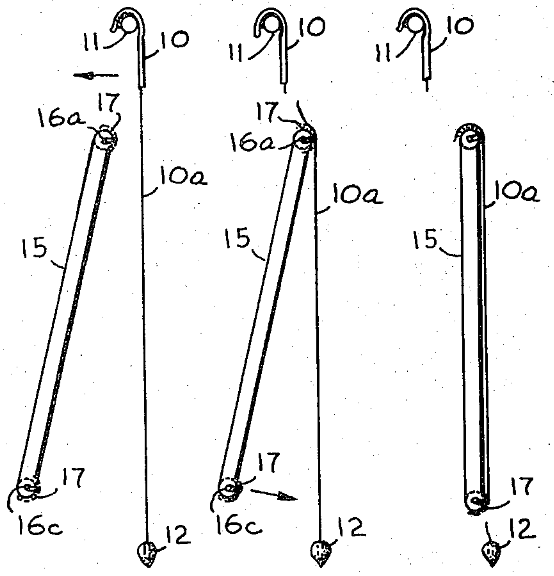
FIGURE 5 illustrates the first basic step to be practiced in mounting the wire on the frame.
FIGURE 6 illustrates the second basic step to be followed in mounting the wire on the frame.
FIGURE 7 illustrates the third basic step in mounting the wire on the frame.

Having applied the Bright Gold N.W. compound, it is allowed to dry slightly in air, and a 15-minute cycle is usually sufficient for this purpose. Glass frame 15 is then supported in such a way that the coated sides are horizontal with the top coated side extended forward over the bottom coated side, that is to say, the frame is held at an angle in the manner shown in FIG. 5. Following this, the etched platinum wire is then carefully picked up and, again, as is shown in FIG. 5, is positioned with respect to the frame in such a way that etched portion 10*a* will clearly contact the coated sides of the frame. At this point, the wire is slowly moved towards the frame until the top end of platinum wire 10*a* makes contact with material 17 on the top and forward side of the frame. When this is done, this top end of wire 10*a* will stick to material 17, at which time wire 10*a* is carefully cut loose from the glass rod, as close to the frame as possible, all of which is clearly illustrated in FIG. 6. It will seem that as soon as the wire is cut, the surface tension of the Bright Gold N.W. compound will pull in the loose cut end.

To complete the mounting, frame 15 is slowly rotated on a horizontal axis until the coated bottom side of the frame contacts the lower end of wire 10*a*, with the result that this end, too, will cling to material 17. The excess wire, namely, the end with the butyl acetate jacket on it, is thereafter cut from the bottom as close to the frame as possible. Here again, the Bright Gold N.W. will pull in the loose cut end. Reference is made to FIG. 7 wherein this is illustrated.

The next step is to air fire the frame and the mounted wire in an oven per the recommendations of the manufacturer of Bright Gold N.W. (Hanovia Corp., Newark, N.J.). This is typically done at or about 450° C. After firing, it will be found that there is electrical continuity between the connecting rods and wires, due to the metallic gold formed by the decomposition of the Bright Gold N.W. compound. More specifically, the gold film bonds to the glass substrate, to the platinum wire, and to the electrical connecting rods or wires. If desired, the cleanliness of the etched wire can be determined by placing the frame in a vacuum and passing electrical current through the platinum wire. If the platinum wire is clean, it will glow uniformly throughout its length (except near the ends connected to the frame which cools the ends of the wire by conduction). If there are dark spots on the wire, they are caused either by residual traces of the silver jacket, indicating incomplete etching, or air-borne dust particles which have settled on the wire. Occasionally, a bright spot will show on the wire, and this is an indication of a defect in the wire, which will usually lead to an early failure. After the cleanliness and quality of the wire have been determined, the frame assembly can be mounted according to the user's needs.

It should be noted that in all of the steps following removal of the etched wire from the acid solution, care should and must be exercised to avoid sudden movements or air currents; air drag on long, thin wires can result in forces which will exceed the tensile strength of the platinum and result in breakage. In addition, air drag forces between the time the platinum wire is mounted to the frame and the time the frame is air fired can cause the wire to pull through the Bright Gold compound and result in a loose wire after firing.

Figure 8:
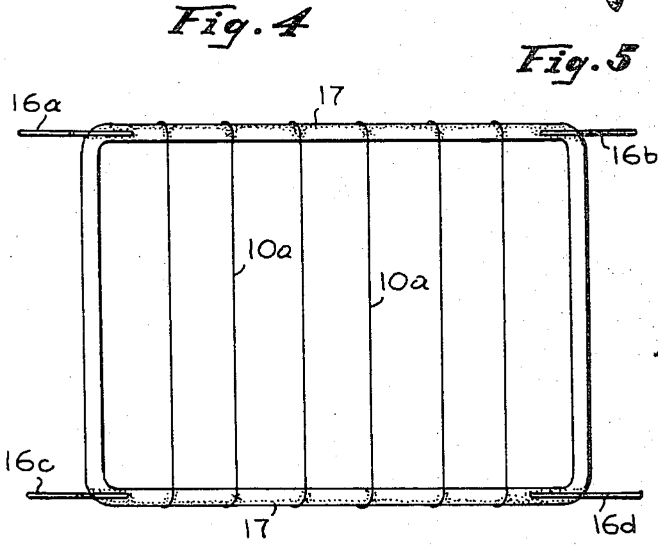
FIGURE 8 illustrates a frame of the kind shown in FIGURE 4 with an array of fine wires mounted thereon.

Finally, it should be mentioned that although the mounting of only one wire was described herein, the same method can be used to mount a plurality of these fine wires on a frame, as is illustrated in FIG. 8. Thus, it should be understood that this method is not limited to only mounting a single wire. Moreover, although a particular arrangement of the invention has been illustrated and described above by way of example, it is not intended that the invention be limited thereto. Accordingly, the invention should be considered to include any and all variations or equivalent arrangements falling within the scope of the annexed claims.

Having thus described the invention, what is claimed is:

1. A method for mounting a length of extremely fine wire on a frame, said method comprising the steps of:

Coating one end of the wire with a material having sufficient weight to keep the wire vertically straight when freely suspended from its other end; freely suspending the length of wire from said other end; coating a pair of opposite sides of the frame with a metallo-organic compound that will form a metallic film thereon when suitably heated; bringing top and and bottom portions of the wire into contact with said coated sides of the frame by rotatably positioning the frame in such a manner that one of the coated sides of the frame is nearer the wire than the other of the coated sides, slowly moving the suspended wire toward the frame until the top portion of the wire contacts the nearer coated side thereof, and rotating the frame until the other coated side thereof contacts the bottom portion of the wire; and heating the frame and the wire to reduce said metallo-organic compound to a metallic film that bonds the wire to the sides of the frame.

2. The method defined in claim 1 wherein the material coated on one end of the wire is one that is not affected by acid.

3. The method defined in claim 2 wherein the wire has a platinum core that is surrounded by a silver jacket, and wherein said method further includes the step of immersing the suspended wire in an acid bath until said silver jacket is etched away before bringing it into contact with the sides of the frame.

4. The method defined in claim 1 wherein the step of heating the frame and wire includes the step of air firing them at a temperature of about 450° C.

5. The method defined in claim 1 wherein the material coated on said one end of the wire is one that is not affected by acid; wherein the wire has a platinum core that is surrounded by a silver jacket; wherein said method further includes the step of immersing the suspended wire in an acid bath until said silver jacket is etched away before bringing it into contact with the sides of the frame; wherein the step of bringing the wire into contact with the coated sides of the frame includes rotatably positioning the frame in such a manner that one of the coated sides of the frame is nearer the wire than the other of the coated sides, slowly moving the suspended wire toward the frame until the top portion of the wire contacts the nearer coated side thereof, and rotating the frame until the other coated side thereof contacts the bottom portion of the wire; and wherein the step of heating the frame and wire includes the step of air firing them at a temperature of about 450° C.

References Cited

UNITED STATES PATENTS

| | | | |
|---|---|---|---|
| 2,519,445 | 8/1950 | Drieschman | 29—493 X |
| 2,523,063 | 9/1950 | Roos | 33—216 X |
| 2,549,551 | 4/1951 | Walsh | 29—493 X |
| 2,951,224 | 8/1960 | Magrath | 73—355 X |

OTHER REFERENCES

How To Apply Noble Metals to Ceramics, by Ralph T. Hopper, Ceramic Industry, June 1963.

JOHN F. CAMPBELL, *Primary Examiner.*

R. F. DROPKIN, *Assistant Examiner.*

U.S. Cl. X.R.

29—473.1, 493, 497.5, 498, 504